Sept. 22, 1953   E. L. DE SHAZO, JR   2,653,305
METHOD OF AND APPARATUS FOR MEASURING
THE POLARITY OF SEISMOMETERS
Filed June 10, 1949

INVENTOR.
E. L. DESHAZO, JR.
BY Hudson & Young
by L. Malcolm Oberlin
ATTORNEYS

Patented Sept. 22, 1953

2,653,305

UNITED STATES PATENT OFFICE 2,653,305

METHOD OF AND APPARATUS FOR MEASURING THE POLARITY OF SEISMOMETERS

Earl L. De Shazo, Jr., Bartlesville, Okla., assignor to Phillips Petroleum Company, a corporation of Delaware Application June 10, 1949, Serial No. 98,339

6 Claims. (Cl. 340—15)

This invention relates to a method of and apparatus for measuring the polarity of a seismometer of the moving coil type.

In seismometers of the moving coil type, a current is generated in the coil of the seismometer when the casing thereof is moved relative to the coil by seismic waves or other earth disturbances. The voltages induced in the coil are amplified and fed to a recording device which produces a trace upon a recording medium which is representative of the seismic signals incident upon the seismometer. The seismometer is ordinarily connected to the amplifying and recording device by two leads forming a part of a cable. If the connection of these leads to the seismometer is reversed, it will be apparent that the trace produced upon the recording medium will be shifted 180 degrees about its reference line. That is, a wave which would produce a trace upwardly displaced from the reference line will produce a trace downwardly displaced from the reference line if the polarity of the leads connecting the seismometer to the recorder is reversed, thereby making it difficult to interpret the record. When a number of traces are recorded simultaneously upon a single medium, it is important that all the seismometers be of the same polarity when connected to the recorder. Otherwise, the same seismic wave will produce upward traces upon the record where the seismometers are connected in one polarity and downward traces where the seismometers which are connected in opposite polarity.

It is an object of this invention to provide a simple reliable circuit for determining the polarity of one or more seismometers.

It is a further object to provide a circuit which will enable a short circuited or open circuited seismometer to be immediately located.

It is a still further object to provide a circuit which is reliable in operation, simple in construction and which utilizes a minimum number of standard circuit components.

Various other objects, advantages and features of the invention will become apparent to one skilled in the art from the accompanying drawings and description, in which.

Figure 1:
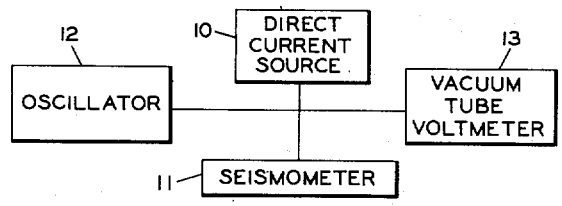
Figure 1 is a block diagram of the circuit.

Referring now to the drawings in detail, and particularly to Figure 1, the circuit comprises a direct current source 10 which causes a small direct current to flow through the seismometer 11, this current preferably having a magnitude in the order of 5 milliamperes, that is, enough current to cause the moving element to move through the entire deflection range. If the seismometer has the proper polarity in its connection in the circuit, the moving coil thereof is deflected upwardly responsive to the described flow of direct current, and this causes the mechanical resonant frequency of the seismometer to decrease. In a typical case, the resonant frequency of the seismometer with the coil deflected upwardly may be of the order of 17 cycles per second. If the seismometer is connected in the circuit on opposite polarity, the coil is deflected downwardly by the flow of direct current therethrough so that the resonant frequency increases due to increased tension on the support springs. In a typical case, the resonant frequency may be of the order of 23 cycles per second when the coil is deflected downwardly. The invention is also applicable to other types of seismometers, for example, a seismometer where the coil is fixed and the suspended element is a permanent magnet.

In accordance with the invention, an alternating voltage is superimposed upon the direct voltage applied to the seismometer by an oscillator 12, the alternating current preferably having a frequency below the lowest possible resonant frequency of the seismometer. In a typical case, oscillator 12 may have a frequency of 12 cycles per second. Alternatively, the oscillator may have a frequency above the highest possible resonant frequency of the seismometer, for example, 30 cycles per second. A vacuum tube voltmeter 13 is connected in circuit with the seismometer to measure the voltage drop thereacross. If the seismometer is connected in the circuit with such polarity that the coil is deflected upwardly, and the resonant frequency is 17 cycles per second, it will be apparent that the impedance of the seismometer is less than if the coil is deflected downwardly so that the resonant frequency is 23 cycles per second. Accordingly, a higher reading is obtained on the vacuum tube voltmeter in the first case than in the second case.

As an explanation of the theory of operation of the testing system of this invention, when an alternating voltage, for example 12 cycles per second, is applied to the seismometer coil, forced vibrations of the coil will occur at the impressed frequency. These forced vibrations will be of relatively high amplitude if the impressed frequency is close to the resonant frequency, and of relatively low amplitude if the impressed frequency is remote from the resonant frequency. The resulting movement of the coil in the magnetic field causes the wires of the coil to cut magnetic lines of force with the result that an electromotive force is developed across the coil which is of relatively high amplitude when the vibrations of the coil are likewise of relatively high amplitude, i. e., when the impressed frequency is close to the resonant frequency, and of low amplitude when the amplitude of the coil vibration is low, i. e., when the impressed frequency is remote from the resonant frequency. Accordingly, the voltage read by the vacuum tube voltmeter is greater when the applied frequency is close to the resonant frequency than when the applied frequency is remote from the resonant frequency.

Figure 3:
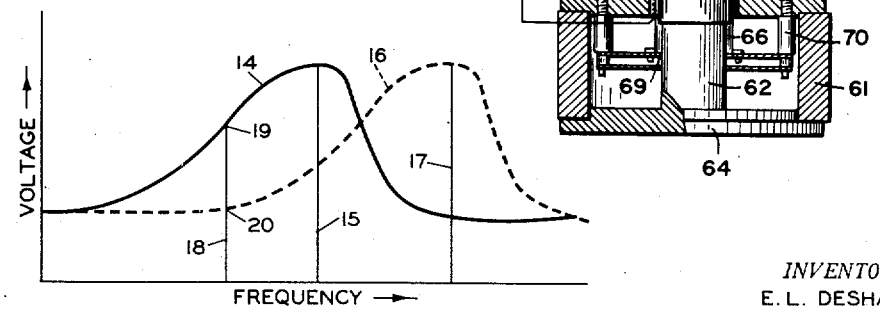
Figure 3 is a graph illustrating feature of the invention.

These conditions are illustrated by Figure 3 wherein curve 14 represents the frequency-voltage characteristics of the seismometer when the coil is raised by the direct voltage passed therethrough, this curve having a maximum amplitude at the region 15 representing a frequency of 17 cycles per second. Curve 16 represents the frequency-voltage characteristics when the coil is depressed by the direct voltage passed therethrough, this curve having a maximum value at the region 17 representing a frequency of 23 cycles per second. The line 18 represents the oscillator frequency of 12 cycles per second and it will be apparent that the voltage 19 developed across the seismometer is substantially higher when the polarity is such that the coil is deflected upwardly than the voltage 20 produced at the same frequency when the polarity is such that the coil is deflected downwardly.

Preferably and advantageously, the voltage 20 produces one-third full scale deflection upon the voltmeter 13 while voltage 19 produces two-thirds of the full scale deflection. With this arrangement, a zero reading is produced if the impedance in the seismometer circuit is zero due to a short circuit. If the seismometer is open circuited, the impedance is extremely high, and a full scale reading is obtained on the voltmeter. Accordingly, by merely glancing at the voltmeter, the operator can determine the polarity of the seismometer and whether or not it is short circuited or open circuited.

Preferably and advantageously, the oscillator 12 includes an electron tube 22 having an anode, a cathode, and a control grid. The cathode of the tube is connected to ground through a bias resistor 23, the resistance of which increases with temperature, the anode being connected through a voltage dropping resistor 24 to a positive power supply terminal 25, and through a coupling condenser 26 to the control grid of a triode 27, said control grid being connected to ground through a grid resistor 28. The cathode of tube 27 is connected to ground through a bias resistor 29, its anode being connected through a voltage dropping resistor 30 to a positive power supply terminal 31, and through a coupling condenser 32 to a potentiometer 33. The anode of tube 27 is also connected through a coupling condenser 34 and a unit including a resistance 35 and a condenser 36 connected in series to the control grid of tube 22. This control grid is also connected to ground through a resistor 37 which is shunted by a condenser 38. The cathode of tube 22 is connected through a resistor 39 to the junction between condenser 34 and resistance 35.

In operation, the tubes 22 and 27 function as amplifiers, a portion of the amplifier output being fed back through resistance-capacitance unit 35, 36 to the control grid of tube 22, thereby providing regenerative coupling between the output and input of the amplifier. The frequency of oscillation is controlled by the time constants of the resistance-capacitance units 35, 36 and 37, 38. With this type of oscillator, frequencies in the range of 12 to 30 cycles per second may be readily obtained, and the varying ohmic value of resistance 23 maintains a constant amplitude, stable wave form despite changes in temperature.

The alternating voltage produced by the oscillator is fed through a coupling resistance 39 to a grounded load resistor 40 having output jacks 41, 42 connected to the respective terminals thereof. The seismometer to be tested is connected to these jacks so that the alternating voltage produced by the oscillator passes through the seismometer coil together with a direct voltage from positive power supply terminal 43 and voltage dropping resistor 44.

The vacuum tube voltmeter 13 includes a pentode 46 having its control grid connected through a coupling condenser 47 to the junction between resistors 39 and 40, the control grid also being connected to ground through a grid resistor 48. The cathode of tube 46 is connected to ground through a bias resistor 49 shunted by a by-pass condenser 50 and the suppressor grid is connected directly to ground. The screen grid and plate of tube 46 are interconnected and communicate through a voltage dropping resistor 51 with a positive power supply terminal 52. The anode of the tube is also connected to ground through a coupling condenser 53, a resistor 54, and a meter 55, the meter and resistor being shunted by a rectifier 56. Although only one stage of amplification is shown for the vacuum tube voltmeter, it will be apparent that two or more stages may be utilized, if desired.

Figure 2:
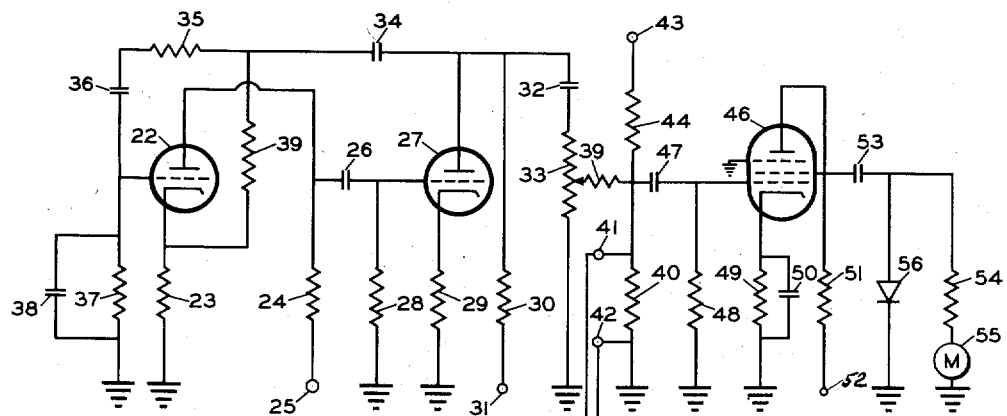
Figure 2 is a schematic circuit diagram.

One particular type of seismometer to which the testing circuit is applicable is shown in Figure 2 and described more fully in Patent 2,487,029 to R. G. Piety. This seismometer includes a pair of spaced annular permanent magnets 60 and 61. Cooperating with the permanent magnets are a central rod 62, a pair of spaced end caps 63, 64 and an annular central plate 65 of magnetic material. These parts cooperate to form two magnetic circuits, the annular plate 65 being common to both, in which manner a magnetic field is established in the air gap between rod 62 and the annular member 65. Mounted in the air gap is a cylindrical inertia body 66 carrying a coil 67, the inertia body being suspended by a pair of leaf springs 68, 69 secured to suitable supports 70. In testing the seismometer, the coil is connected to terminals 41, 42 by leads 71 and 72, respectively.

With the seismometer at rest, there is a downward stress upon the springs 68, 69 due to the weight of the inertia body and coil assembly. In this state, the seismometer has a resonant frequency determined by the length, width, thickness, and stiffness of the springs together with the weight and location of the inertia body assembly. If a direct current is applied to the coil of such polarity as to exert a downward force, the stress upon the springs is increased, with the result that the resonant frequency of the seismometer increases if the leads are connected thereto in the proper polarity. Conversely, if the force applied by the direct current tends to move the coil upwardly, there is a decrease in the stress upon the springs and a decrease in the resonant frequency of the seismometer.

In the variable reluctance type of seismometer, the coil is mounted upon the casing and a permanent magnet or electromagnet is suspended by springs from the casing so as to produce a magnetic field in the coil. With such seismometers, application of a direct current to the coil produces a force upon the magnet tending to increase or decrease the tension in the spring suspension with respect to its original tension, thereby changing the resonant frequency of the seismometer.

The operation of the circuit is similar to that described in connection with the block diagram of Figure 1, the meter 55 enabling the operator to determine by a glance the polarity of the seismometer under test, and whether it is short or open circuited.

While the invention has been described in connection with a present, preferred embodiment thereof, it is to be understood that this description is illustrative only and is not intended to limit the invention, the scope of which is defined by the appended claims.

Having described my invention, I claim:

1. Apparatus for determining the polarity of a seismometer which comprises, in combination, an oscillator, a source of direct current, an output impedance, means for impressing the output of said oscillator and said direct current source across said impedance, a seismometer incorporating a coil disposed in a magnetic field, leads connecting said coil to said output impedance and thereby in circuit with said oscillator and said direct current source, the direct current moving the coil in one direction when said leads are connected in one polarity, and said direct current moving the coil in the opposite direction when said leads are connected in the opposite polarity, and means for measuring the alternating current voltage drop across said impedance.

2. Apparatus for determining the polarity of a seismometer which comprises, in combination, an amplifier having an input circuit and output circuit, means for feeding a portion of the amplifier output to said input circuit to produce oscillations, a source of direct current, an output impedance, means for impressing the output of said oscillator and said direct current source across said impedance, a seismometer incorporating a coil disposed in a magnetic field, leads connecting said coil to said output impedance and thereby in circuit with said oscillator and said direct current source, the direct current moving the coil in one direction when said leads are connected in one polarity, and said direct current moving the coil in the opposite direction when said leads are connected in the opposite polarity, and a vacuum tube voltmeter for measuring the alternating current voltage drop across said impedance.

3. Apparatus for determining the polarity of a seismometer which comprises, in combination, an oscillator including an amplifier having an input circuit and an output circuit, a resistance-capacitance unit, means for feeding a portion of the amplifier output through said unit to the amplifier input to produce oscillations, the time constant of said unit determining the frequency of said oscillations, a load resistor, means for feeding the output of said oscillator to said load resistor, means for establishing a direct current potential across said resistor, a seismometer incorporating a coil disposed in a magnetic field, leads connecting said coil to said output impedance and thereby in circuit with said oscillator and said direct current source, the direct current moving the coil in one direction when said leads are connected in one polarity, and said direct current moving the coil in the opposite direction when said leads are connected in the opposite polarity, and a vacuum tube voltmeter for measuring the alternating current voltage drop across said resistor.

4. The method of testing the polarity of a seismometer of the electromagnetic type which comprises passing a direct current through the seismometer coil of sufficient strength as to displace the coil from its neutral position, whereby the resonant frequency of the seismometer varies with the polarity of said direct current, passing an alternating current through said seismometer coil, and measuring the alternating current voltage drop across the seismometer coil to determine the polarity of the seismometer.

5. The method of testing the polarity of a seismometer of the moving coil type which comprises passing a direct current through the seismometer of sufficient strength as to displace the coil from its neutral position, whereby the resonant frequency of the seismometer varies in accordance with the direction of said displacement, passing an alternating current through the seismometer coil of a frequency substantially lower than the resonant frequency of the seismometer, and measuring the alternating current voltage drop across the seismometer coil to determine the polarity thereof.

6. The method of testing the polarity of a seismometer of the moving coil type which comprises passing a direct current through the seismometer and through an impedance, said current being of sufficient strength as to displace the coil from its neutral position, whereby the resonant frequency of the seismometer varies in accordance with the direction of said displacement, passing an alternating current through the seismometer coil and through said impedance of a frequency substantially lower than the resonant frequency of the seismometer, and measuring the alternating current voltage drop across said impedance to determine the polarity of the seismometer coil.

EARL L. DE SHAZO, Jr.

References Cited in the file of this patent

UNITED STATES PATENTS

| Number | Name | Date |
|---|---|---|
| 733,627 | Cox | July 14, 1903 |
| 2,232,476 | Ritzmann | Feb. 18, 1941 |
| 2,307,792 | Hoover | Jan. 12, 1943 |
| 2,338,872 | Robidoux | Jan. 11, 1944 |
| 2,372,056 | Broding | Mar. 30, 1945 |
| 2,423,970 | Gardner | July 15, 1947 |
| 2,481,282 | Bialous | Sept. 6, 1949 |
| 2,591,177 | Mayne | Apr. 1, 1952 |